US012322849B2

(12) United States Patent
Lin et al.

(10) Patent No.: US 12,322,849 B2
(45) Date of Patent: Jun. 3, 2025

(54) MANUFACTURING METHOD OF DIELECTRIC WAVEGUIDE RADIO-FREQUENCY DEVICE

(71) Applicant: TIANJIN UNIVERSITY, Tianjin (CN)

(72) Inventors: Bin Lin, Tianjin (CN); Hetian Hou, Tianjin (CN); Haoji Wang, Tianjin (CN); Tianyi Sui, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 18/670,324

(22) Filed: May 21, 2024

(65) Prior Publication Data

US 2024/0304977 A1 Sep. 12, 2024

Related U.S. Application Data

(63) Continuation of application No. PCT/CN2022/133603, filed on Nov. 23, 2022.

(30) Foreign Application Priority Data

Nov. 24, 2021 (CN) ......................... 202111405712.8

(51) Int. Cl.
*H01P 11/00* (2006.01)

(52) U.S. Cl.
CPC .......... *H01P 11/006* (2013.01); *H01P 11/007* (2013.01)

(58) Field of Classification Search
CPC ............................. H01P 11/006; H01P 11/007
See application file for complete search history.

(56) References Cited

U.S. PATENT DOCUMENTS

2019/0123448 A1* 4/2019 Taraschi ............... H01Q 9/0485
2021/0280954 A1* 9/2021 Chun ...................... H01P 1/163

FOREIGN PATENT DOCUMENTS

CN 103188867 A 7/2013
CN 104253296 A 12/2014
CN 106560950 A 4/2017
CN 108365308 A 8/2018

(Continued)

OTHER PUBLICATIONS

International Search Report of PCT/CN2022/133603.

(Continued)

*Primary Examiner* — Andrea Lindgren Baltzell
*Assistant Examiner* — Kimberly E Glenn

(57) ABSTRACT

Provided is a manufacturing method of a dielectric waveguide radio-frequency device, which relates to a manufacturing method of waveguide radio-frequency devices. The object of the present disclosure is to solve the issues of high costs, low processing efficiency, poor dimensional accuracy, poor surface quality, low device performance and inability to manufacture the ceramic waveguide radio-frequency devices in huge batches in the existing manufacturing method of the ceramic waveguide radio-frequency devices. The method includes: I. sectioning, II. slotting, III. processing tuning hole, IV. processing energy input hole, V. adhesive coating, stacking, VI. bonding, and VII. entire metallization, so as to obtain the dielectric waveguide radio-frequency device. In the present disclosure, more complex and diverse device topology structures can be manufactured, reducing the device manufacturing difficulty, and improving the accuracy allowance.

10 Claims, 4 Drawing Sheets

(56) References Cited

FOREIGN PATENT DOCUMENTS

| | | | | | |
|---|---|---|---|---|---|
| CN | 109534789 | A | | 3/2019 | |
| CN | 111048874 | A | | 4/2020 | |
| CN | 111266813 | A | | 6/2020 | |
| CN | 111300728 | A | | 6/2020 | |
| CN | 112751152 | A | * | 5/2021 | ............ H01P 11/002 |
| CN | 114006144 | A | | 2/2022 | |
| JP | 2006340141 | A | | 12/2006 | |
| JP | 2015188143 | A | | 10/2015 | |
| KR | 20090041009 | A | | 4/2009 | |
| KR | 20220104985 | A | * | 7/2022 | .............. H01P 1/203 |

OTHER PUBLICATIONS

Written Opinion of PCT/CN2022/133603.
T.M. Weller et.al. Analysis and Design of a Novel Noncontacting Waveguide Backshort. In IEEE Transactions on Microwave Theory and Techniques 43(5):1023-1030.1995.06.
Songtao LI. Design, fabrication, and performance study of integrated waveguide filters with cavity substrates based on LTCC. In CDMD. Mar. 15, 2021.

* cited by examiner

MANUFACTURING METHOD OF DIELECTRIC WAVEGUIDE RADIO-FREQUENCY DEVICE

CROSS-REFERENCE TO RELATED APPLICATIONS

This Application is a bypass application of PCT/CN2022/133603. This application claims priorities from PCT Application No. PCT/CN2022/133603, filed Nov. 23, 2022, and from the Chinese patent application 202111405712.8 filed Nov. 24, 2021, the content of which are incorporated herein in the entirety by reference.

TECHNICAL FIELD

The present disclosure relates to a manufacturing method of a dielectric waveguide radio-frequency device.

BACKGROUND

The waveguide radio-frequency devices mainly include waveguide tubes, waveguide filters, waveguide multiplexer, and waveguide antennas and the like, which can achieve transmission and processing of electromagnetic waves by propagation and coupling of electromagnetic waves of radio-frequency band inside waveguide cavities. Compared with air dielectric waveguide, when the dielectric part of the waveguides is manufactured with a ceramic material, the size of the devices can be adjusted (usually reduced) by virtue of high dielectric constant of the ceramics, so as to achieve device integration.

When a common ceramic waveguide radio-frequency device is manufactured, a semi-finished product is first formed by sintering a ceramic powder and then goes through precision processing, increasing the costs, reducing the processing efficiency and lowering the dimensional accuracy, and hence lowering the performance of the device.

In the high-temperature co-fired ceramics technology or low-temperature co-fired ceramics technology, a green ceramic tape is formed by casting a ceramic powder and a resin adhesive, and then a conductive metal paste is printed on the green ceramic tape to achieve circuit layout; and then multiple layers of circuit-printed green ceramic tapes are stacked and sintered at high temperature to form a ceramic device with an internal line. But on the one hand, the green ceramic tape using this technology may shrink during a sintering process, leading to dimensional error of the device; and on the other hand, this technology cannot be used to manufacture the waveguide radio-frequency devices but only to print circuits to form capacitor, inductor and resistance structures and form resonant circuits so as to achieve the functions of filtering and the like. This solution is applicable to those low-frequency cases. In a case of high frequency, the conduction loss in the metal circuits is significantly increased, reducing the transmission efficiency of the devices and deteriorating their performances.

The dielectric integrated waveguide is a new technology developed based on high-temperature co-fired ceramics and low-temperature co-fired ceramics technologies. In this technology, microhole arrays with a special structure are processed on the green ceramic tapes and metallized on the inner walls of the holes and hence the electromagnetic waves are controlled by hole distance so as to achieve waveguide effect. This process still has the disadvantage of sintering shrinkage, and the processes for microhole manufacturing and hole inner wall metallization are complex. In this case, the constraint for the electromagnetic waves is insufficient, leading to exposure and lowering the performance of the devices.

The ceramic additive manufacturing technology can also be applied to manufacturing the ceramic waveguide radio-frequency devices. On the one hand, the accuracy of the ceramic additive manufacturing is low, and the surface quality is poor, which is unfavorable for device stabilization and qualified manufacturing; on the other hand, the ceramic micro powder required by the additive manufacturing is difficult to manufacture, and hence the costs are high, leading to failure to manufacture the ceramic waveguide radio-frequency devices in huge batches at low costs.

SUMMARY

In order to solve the issues of high costs, low processing efficiency, poor dimensional accuracy, poor surface quality, low device performance and inability to manufacture the ceramic waveguide radio-frequency devices in huge batches in the existing manufacturing method of the ceramic waveguide radio-frequency devices, the present disclosure provides a manufacturing method of a dielectric waveguide radio-frequency device.

There is provided a manufacturing method of a dielectric waveguide radio-frequency device, which is completed in the following steps:

I. sectioning:

a dielectric waveguide radio-frequency device is designed, and a dielectric material is sectioned into n layers along a direction based on a model of the dielectric waveguide radio-frequency device, and then ground, polished, and cut to obtain n dielectric material sheets; the n dielectric material sheets are stacked from bottom up;

II. coupling:

based on design requirements of the dielectric waveguide radio-frequency device, a number of dielectric resonant cavities is determined, and coupling designing is performed between adjacent dielectric resonant cavities, and then a coupling structure is processed on the corresponding sheets of the n dielectric material sheets;

the coupling structure in the step II is of slotting coupling, through hole coupling, blind hole coupling, inclined hole coupling or windowing coupling;

III. processing tuning hole:

based on the number and a depth of the resonant cavities disposed based on the model of dielectric waveguide radio-frequency device, a tuning hole is processed respectively on the n dielectric material sheets;

IV. processing energy input hole:

on the last dielectric material sheet, an energy input hole is processed respectively on back surfaces of two resonant cavities;

V. adhesive coating, stacking/local metallization, adhesive coating, and stacking:

when the coupling structure in the step II is of slotting coupling, through hole coupling, blind hole coupling, or inclined hole coupling, an adhesive is coated on an upper surface of each dielectric material sheet other than a first dielectric material sheet and then the dielectric material sheets are sequentially stacked from bottom up to obtain n adhesive-coated dielectric material sheets;

when the coupling structure in the step II is of windowing coupling, local metallization is performed on a coupling structure part of the dielectric material sheets, and after the local metallization is completed, the adhesive is coated on the upper surface of each dielectric material sheet other than the first dielectric material sheet while avoiding the metallized part, and finally the dielectric material sheets are sequentially stacked from bottom up to obtain n adhesive-coated dielectric material sheets;

VI. bonding:

bonding is performed based on the following cases to obtain a device;

VII. entire metallization:

① the device is cleaned to remove surface impurities and then air-dried to obtain a dry device;

② the dry device is put into an ion magnetron sputtering instrument, and then with gold as target material, sputtering is performed for 200 s under the current of 8 A to 10 A to obtain a gold-plated device;

③ the gold-plated device is connected with a cathode of an electroplating device and then soaked in an electroplating liquid; an anode of the electroplating device is connected with a pure copper plate, and then electroplating is performed for 40 min under the current of 2 A to 4 A to obtain a copper-plated device;

④ the copper-plated device is connected with the cathode of the electroplating device, and a cotton soaked with a gold-plating chemical solution is connected with the anode of the electroplating device, and coating operation is performed on the surface of the copper-plated device by using the cotton under the voltage of 3V to 5V to complete the gold plating process and obtain the dielectric waveguide radio-frequency device.

Compared with the prior arts, the present disclosure has the following beneficial effects.

1. in the present disclosure, the dielectric waveguide radio-frequency device with complex internal geometric structure can be easily processed so as to manufacture more complex and more diverse device topology structures.
2. in the present disclosure, the complicated mould and difficult ceramic three-dimensional machining in the traditional ceramic device manufacturing process can be avoided, reducing the device manufacturing difficulty and improving the accuracy allowance.
3. in the present disclosure, the dielectric sheets are manufactured after the dielectric plates are selected, which avoids the dimensional shrinkage problem of the devices resulting from post-processing sintering, improving the processing accuracy and achieving good process stability.
4. in the present disclosure, with precision laser processing technology, precision manufacturing of a micro-miniature dielectric waveguide radio-frequency device can be carried out, so as to realize high frequency of the device.
5. the present disclosure is not only applicable to manufacturing of the devices of existing frequency band but also to manufacturing of the micro-miniature dielectric waveguide radio-frequency device of high frequency band, thereby providing the manufacturing capability of the devices of full frequency domain.

BRIEF DESCRIPTIONS OF THE DRAWINGS

Figure 3:
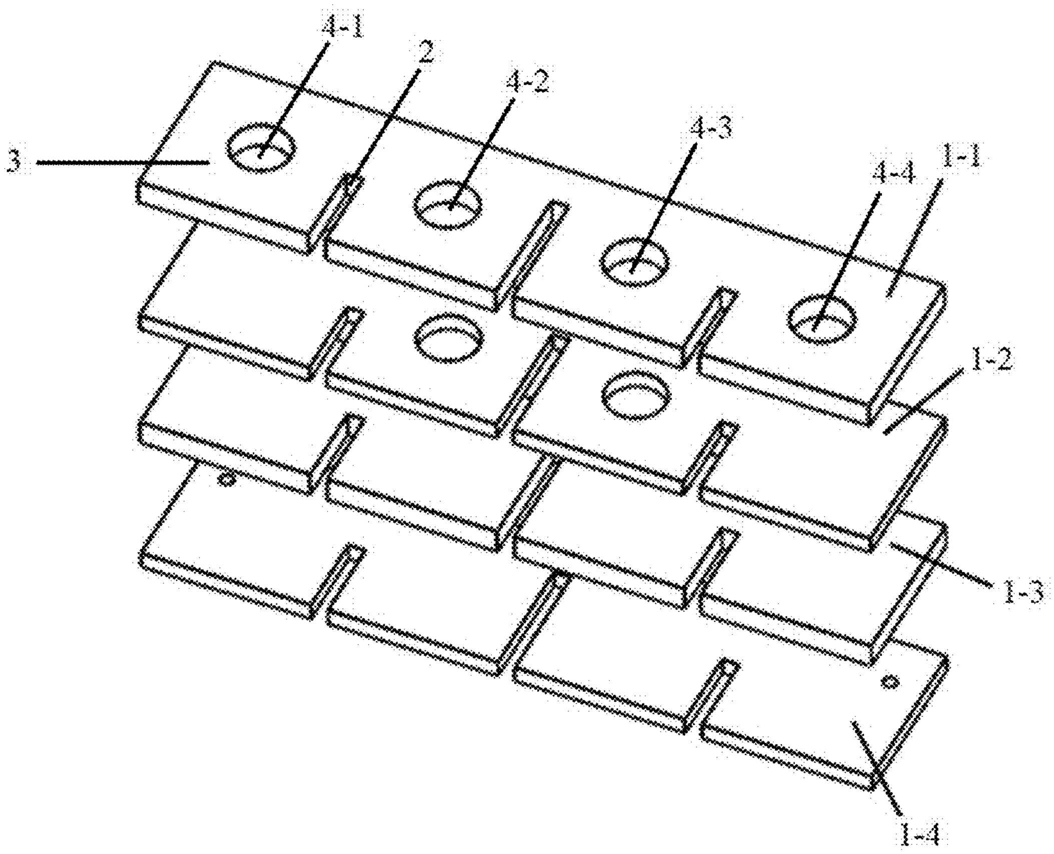

FIG. 3 is a schematic diagram illustrating steps 1 to 3 of manufacturing a four-order symmetric waveguide filter according to an embodiment 1 of the present disclosure, where 1-1 refers to a first dielectric material sheet, 1-2 refers to a second dielectric material sheet, 1-3 refers to a third dielectric material sheet, 1-4 refers to a fourth dielectric material sheet, 2 refers to a slot, 3 refers to a dielectric resonant cavity, 4-1 refers to a first tuning hole, 4-2 refers to a second tuning hole, 4-3 refers to a third tuning hole and 4-4 refers to a fourth tuning hole.

Figure 4:
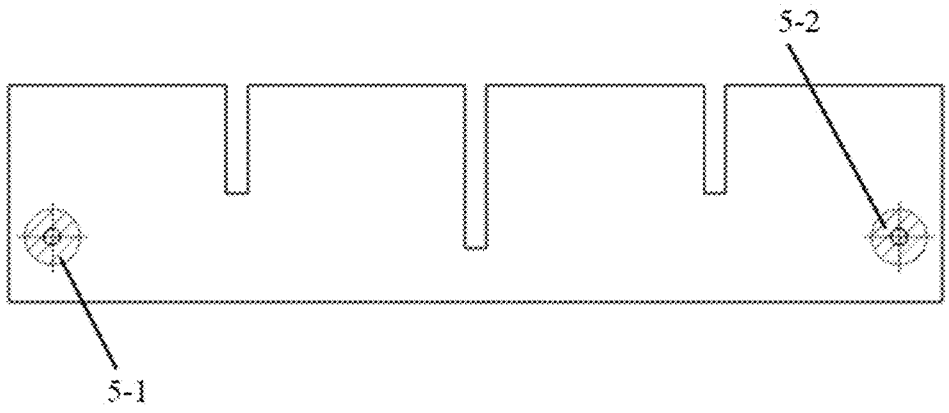

FIG. 4 is a schematic diagram illustrating a step 4 of manufacturing a four-order symmetric waveguide filter according to an embodiment 1 of the present disclosure, where 5-1 refers to a first energy input hole and 5-2 refers to a second energy input hole.

Figure 5:
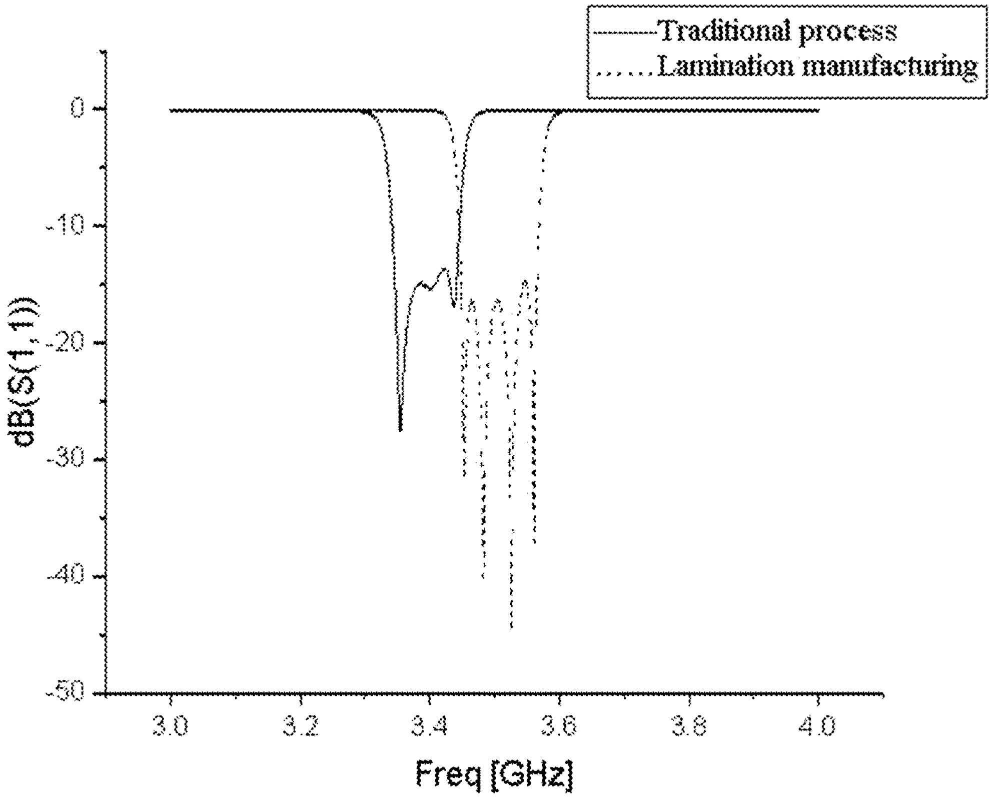

FIG. 5 is a return loss curve of a quartz glass waveguide radio-frequency device.

Figure 6:
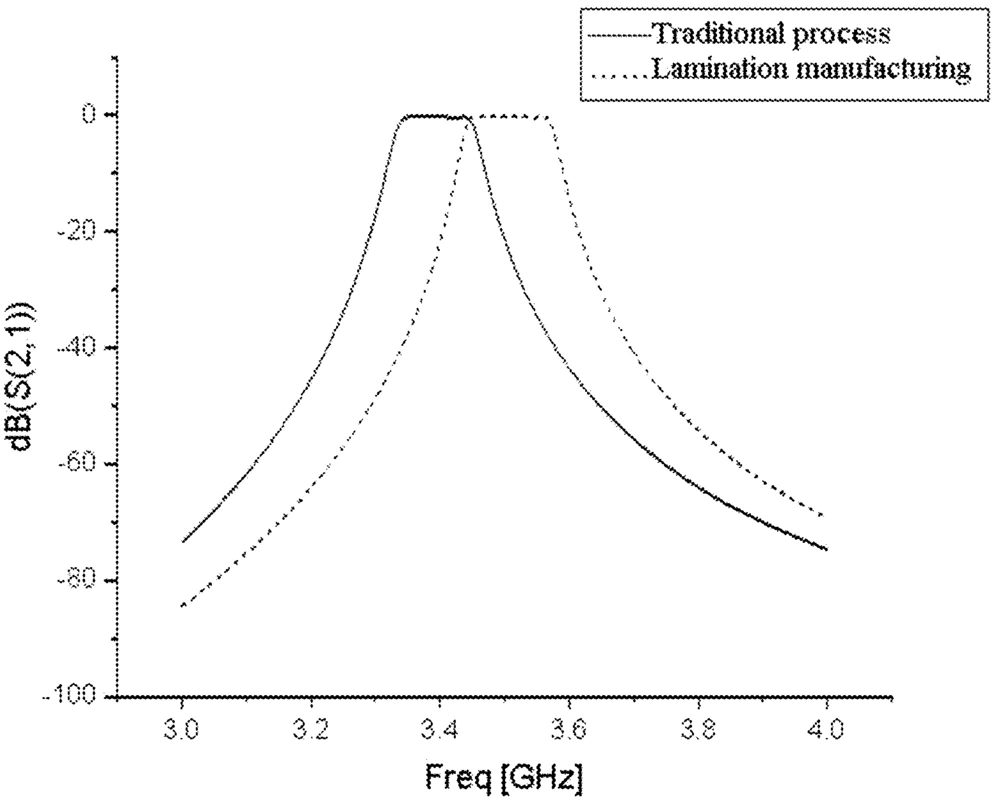

FIG. 6 is an insertion loss curve of a quartz glass waveguide radio-frequency device.

DETAILED DESCRIPTIONS OF EMBODIMENTS

The following embodiments are used to further describe the present disclosure rather than to limit the present disclosure. Any modifications and replacements made to the methods, steps and conditions of the present disclosure without departing from the essence of the present disclosure shall fall within the scope of protection of the present disclosure.

Implementation 1: this implementation provides a manufacturing method of a dielectric waveguide radio-frequency device, which can be completed in the following steps:

I. sectioning:

a dielectric waveguide radio-frequency device is designed, and a dielectric material is sectioned into n layers along a direction based on a model of the dielectric waveguide radio-frequency device, and then ground, polished, and cut to obtain n dielectric material sheets; the n dielectric material sheets are stacked from bottom up;

II. coupling:

based on design requirements of the dielectric waveguide radio-frequency device, a number of dielectric resonant cavities is determined, and coupling designing is performed between adjacent dielectric resonant cavities, and then a coupling structure is processed on the corresponding sheets of the n dielectric material sheets;

the coupling structure in the step II is of slotting coupling, through hole coupling, blind hole coupling, inclined hole coupling or windowing coupling;

III. processing tuning hole based on the number and a depth of the resonant cavities disposed based on the model of dielectric waveguide radio-frequency device, a tuning hole is processed respectively on the n dielectric material sheets;

IV. processing energy input hole:

on the last dielectric material sheet, an energy input hole is processed respectively on back surfaces of two resonant cavities;

V. adhesive coating, stacking/local metallization, adhesive coating, and stacking:

when the coupling structure in the step II is of slotting coupling, through hole coupling, blind hole coupling, or inclined hole coupling, an adhesive is coated on an upper surface of each dielectric material sheet other than a first dielectric material sheet and then the dielectric material sheets are sequentially stacked from bottom up to obtain n adhesive-coated dielectric material sheets;

when the coupling structure in the step II is of windowing coupling, local metallization is performed on a coupling structure part of the dielectric material sheets, and after the local metallization is completed, the adhesive is coated on the upper surface of each dielectric material sheet other than the first dielectric material sheet while avoiding the metallized part, and finally the dielectric material sheets are sequentially stacked from bottom up to obtain n adhesive-coated dielectric material sheets;

VI. bonding:

bonding is performed based on the following cases to obtain a device;

VII. entire metallization

① the device is cleaned to remove surface impurities and then air-dried to obtain a dry device;

② the dry device is put into an ion magnetron sputtering instrument, and then with gold as target material, sputtering is performed for 200 s under the current of 8 A to 10 A to obtain a gold-plated device;

③ the gold-plated device is connected with a cathode of an electroplating device and then soaked in an electroplating liquid; an anode of the electroplating device is connected with a pure copper plate, and then electroplating is performed for 40 min under the current of 2 A to 4 A to obtain a copper-plated device;

the electroplating liquid in the step VII. ③ is purchased from Beichen Hardware Technology Company;

④ the copper-plated device is connected with the cathode of the electroplating device, and a cotton soaked with a gold-plating chemical solution is connected with the anode of the electroplating device, and coating operation is performed on the surface of the copper-plated device by using the cotton under the voltage of 3V to 5V to complete the gold plating process and obtain the dielectric waveguide radio-frequency device;

the gold-plating chemical solution in the step VII. ④ is a cyanide-free gold water provided by Weilan Science and Technology Company.

Implementation 2: this implementation differs from the implementation 1 in that the n dielectric material sheets in the step I have a same thickness or different thicknesses. This implementation is identical in other steps to the implementation 1.

Implementation 3: this implementation differs from one of the implementations 1 and 2 in that the n in the step I is $2 \leq n \leq 100$. This implementation is identical in other steps to the implementations 1 and 2.

Implementation 4: this implementation differs from one of the implementations 1 to 3 in that the thickness of each dielectric material sheet in the step I is 30 μm to 5 mm. This implementation is identical in other steps to the implementations 1 to 3.

Implementation 5: this implementation differs from one of the implementations 1 to 4 in that the dielectric material in the step I is ceramic, glass, fused quartz or resin. This implementation is identical in other steps to the implementations 1 to 4.

Implementation 6: this implementation differs from one of the implementations 1 to 5 in that the local metallization in the step V specifically includes the following steps:

① a non-metallized region is covered by a mask;

the mask in the step ① is an adhesive tape or epoxy resin;

② the n dielectric material sheets are cleaned to remove surface impurities and then air-dried to obtain n dry dielectric material sheets;

③ the n dry dielectric material sheets are put into an ion magnetron sputtering instrument, and then with gold as target material, sputtering is performed for 200 s under the current of 8 A to 10 A to obtain n gold-plated dielectric material sheets;

④ the n gold-plated dielectric material sheets are connected with a cathode of a electroplating device and then soaked in an electroplating liquid; and an anode of the electroplating device is connected with a pure copper plate, and electroplating is performed for 40 min under the current of 2 A to 4 A to obtain n copper-plated dielectric material sheets;

the electroplating liquid in the step VII. ④ is purchased from Beichen Hardware Technology Company;

⑤ the n copper-plated dielectric material sheets are connected with the cathode of the electroplating device, and a cotton soaked with a gold-plating chemical solution is connected with the anode of the electroplating device, and coating operation is performed on the surface of the n copper-plated dielectric material sheets by using the cotton under the voltage of 3V to 5V to complete the gold plating process;

the gold-plating chemical solution in the step VII. ⑤ is a cyanide-free gold water provided by Weilan Science and Technology Company;

⑥ the mask on the surface of the n dielectric material sheets is removed and then the n dielectric material sheets are cleaned to remove surface impurities and then air-dried to complete local metallization. This implementation is identical in other steps to the implementations 1 to 5.

Implementation 7: this implementation differs from one of the implementations 1 to 6 in that the depths of the resonant cavities in the step III are equal or unequal. This implementation is identical in other steps to the implementations 1 to 6.

Implementation 8: this implementation differs from one of the implementations 1 to 7 in that depths of the energy input holes in the step IV are equal or unequal. This implementation is identical in other steps to the implementations 1 to 7.

Implementation 9: this implementation differs from one of the implementations 1 to 8 in that in the case 1 in the step VI: when the adhesive used in the step V is a pre-impregnated (pp) film, the n adhesive-coated dielectric material sheets are put into a mould and cured for 30 min to 120 min at the temperature of 120° C. under the pressure of 0.5 MPa to 20 MPa, and finally an overflowing adhesive layer is ground so as to complete the bonding process;

the pre-impregnated (pp) film is PP/GF60-65@0.15 pre-impregnated film purchased from Duoming New Materials Technology Co., Ltd.;

in case 2: when the adhesive in the step V is a thermal plastic resin film, the n adhesive-coated dielectric material sheets are put into a mould and held for 2 h at the temperature of 150° C. under the pressure of 0.5 to 20 MPa while redundant thermal plastic resin film is removed, so as to complete the bonding process; the thermal plastic resin film is a polyethylene film with a thickness of 0.03 mm to 0.3 mm;

the polyethylene film is purchased from Dezhou Zhengyu Geotechnical Materials Co., Ltd.;

in case 3: when the adhesive in the step V is a premixed adhesive, the n adhesive-coated dielectric material sheets are put into a mould and cured for 10 min to 120 min under the pressure of 0.5 MPa to 20 MPa so as to complete the bonding process; the premixed adhesive is obtained by mixing acrylic resin, curing agent and ceramic powder at a weight ratio of 1.4:1:(0.01 to 1); the ceramic powder is titanium dioxide ceramic powder, barium titanate ceramic powder or magnesium titanate ceramic powder;

the premixed adhesive is XYX-604Y purchased from Ningbo Xiongying Test Equipment Co., Ltd.;

in case 4: when the adhesive in the step V is a thermosetting epoxy resin adhesive, the n adhesive-coated dielectric material sheets are put into a mould and cured for 1 h to 30 h under the pressure of 0.5 MPa to 20 MPa so as to complete the bonding process; the thermosetting epoxy resin adhesive is obtained by mixing A adhesive, B adhesive and titanium dioxide ceramic powder at a weight ratio of 3:1:(0.01 to 1);

the A adhesive and B adhesive are from the brand Dianlv;

in case 5: when the adhesive in the step V is a photosensitive resin adhesive, the photosensitive resin adhesive is a liquid in normal state, and an upper surface of each dielectric material sheet other than the first dielectric material sheet is put into a spin coater and uniformly coated with adhesive for 120 s at the rotation speed of 7000 rpm and then the dielectric material sheets are sequentially stacked with overflowing adhesive removed, and finally, exposed for 2 min to 3 min under ultraviolet light so as to complete bonding process;

the photosensitive resin adhesive is SINWE-3623;

in case 6: when the adhesive in the step V is an organic glue, the n dielectric material sheets are cleaned before being bonded, and then the organic glue is dripped on an upper surface of each dielectric material sheet other than the first dielectric material sheet, and then uniformly coated for 60 s at the rotation speed of 7000 rpm, and then the dielectric material sheets are sequentially stacked with overflowing glue removed, and naturally cured for 10 min to 120 min at room temperature so as to complete the bonding process; the organic glue is polysiloxane;

the organic glue is from the brand Dow Corning DC184;

in case 7: when the adhesive in the step V is an inorganic glue, the n dielectric material sheets are cleaned before being bonded, and then the inorganic glue and the titanium dioxide ceramic powder with a diameter of 1 μm are mixed at a weight ratio of 1:(0.01 to 1) and then coated to an upper surface of each dielectric material sheet other than the first dielectric material sheet, and then the dielectric material sheets are sequentially stacked and held for 12 h to 24 h at normal temperature under the pressure of 0.5 MPa to 20 MPa, and then incubated for 2 h at the temperature of 80° C. to 100° C. and then incubated for 2 h at the temperature of 150° C. and finally cooled down to room temperature so as to complete the bonding process;

the inorganic glue is SINWE-S523 glue;

in case 8: when the adhesive in the step V is an inorganic silica gel, the inorganic silica gel is dripped on an upper surface of each dielectric material sheet other than the first dielectric material sheet, and then uniformly coated for 120 s at the rotation speed of 7000 rpm, then the dielectric material sheets are sequentially stacked with overflowing gel removed, and then stood for 1 h to 12 h under the pressure of 0.5 MPa to 20 MPa so as to complete the bonding process; the inorganic silica gel is a dispersion of nano-level silicon dioxide granules in water or solvent, a weight fraction of the silicon dioxide is 10% to 50%, and the solvent is water or organic solvent; the organic solvent is isopropanol, propylene glycol or anhydrous ethanol;

in case 9: when the adhesive in the step V is an anaerobic adhesive, the n dielectric material sheets are cleaned before being bonded, and then the anaerobic adhesive is dropwise and uniformly coated to an upper surface of each dielectric material sheet other than the first dielectric material sheet, and then the dielectric material sheets are sequentially stacked and held for 24 h at normal temperature under the pressure of 0.5 MPa to 20 MPa while overflowing adhesive is removed, so as to complete the bonding process. This implementation is identical in other steps to the implementations 1 to 8.

Implementation 10: this implementation differs from one of the implementations 1 to 9 in that in the step VII ①, the device is put into an ultrasonic cleaner filled with anhydrous ethanol and cleaned for 1 min. This implementation is identical in other steps to the implementations 1 to 9.

The present disclosure will be further detailed with the drawings and specific embodiments.

Embodiment 1: with one four-order symmetric waveguide filter as an example, the manufacturing method of the dielectric waveguide radio-frequency device of the present disclosure is described. A four-cavity dielectric filter is designed based on the following design requirements:

The dimension of the four-order symmetric waveguide filter: 21 mm×21 mm×7 mm;

Central frequency: 3.5 GHz;

Bandwidth: 0.1 GHz;

Passband range: 3.45 GHz to 3.55 GHz;

Insertion loss: <1 dB;

Return loss: >15 dB.

Figure 1:
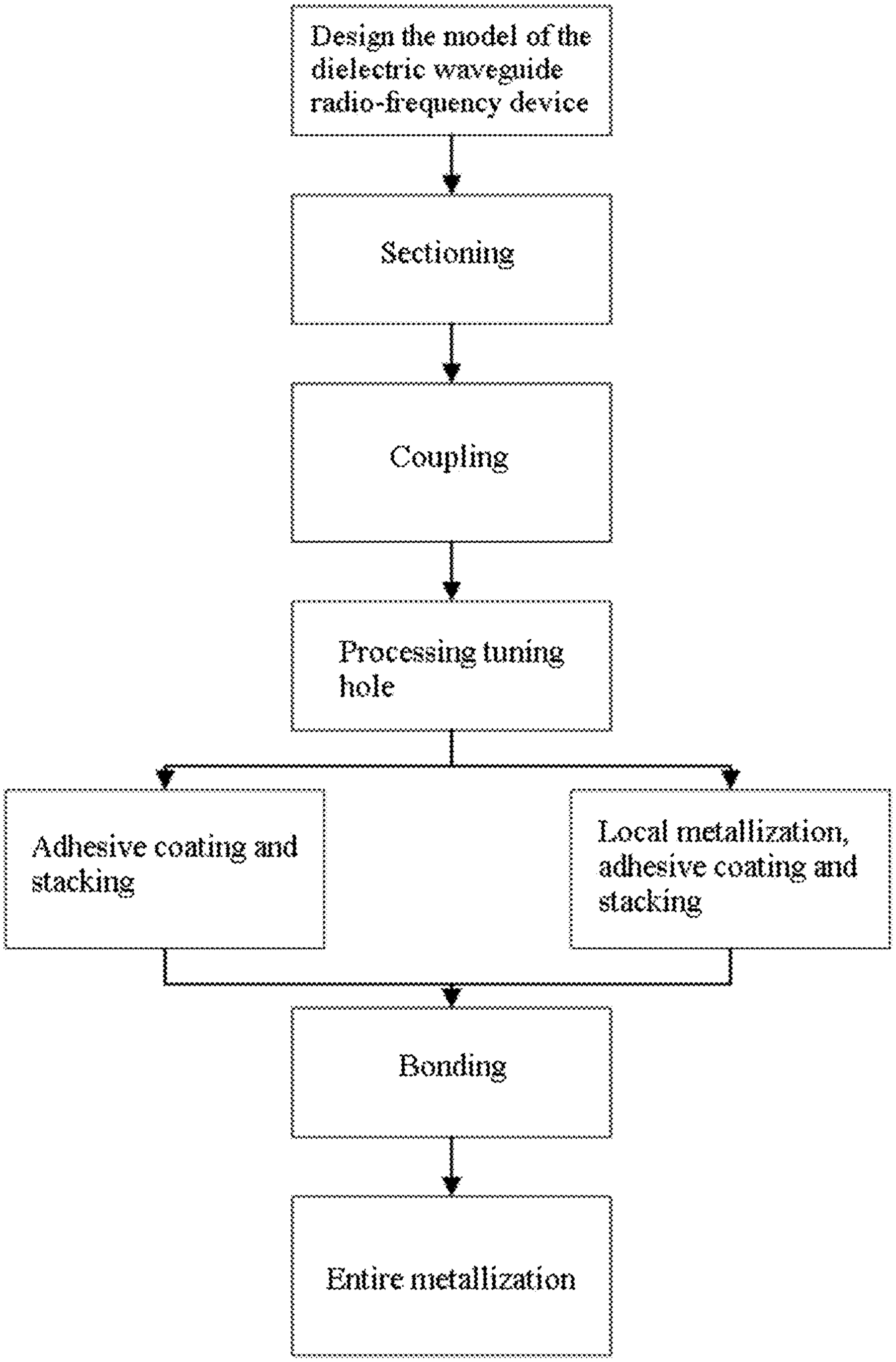
FIG. 1 is a schematic diagram illustrating a process flow of manufacturing a dielectric waveguide radio-frequency device according to the present disclosure.
Figure 2:
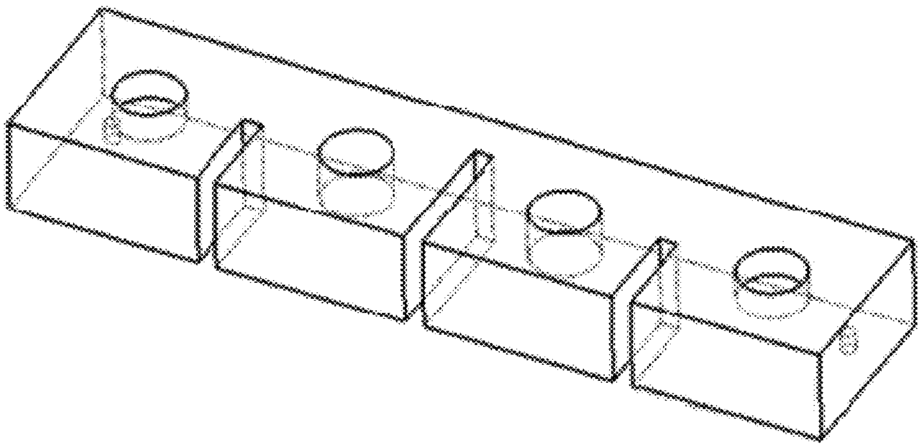
FIG. 2 is a model schematic diagram of manufacturing a four-order symmetric waveguide filter according to an embodiment 1 of the present disclosure.

The manufacturing method of the dielectric waveguide radio-frequency device of the present embodiment can be completed in the following steps:

I. Sectioning:

a model of the dielectric waveguide radio-frequency device is designed as shown in FIG. 2, and based on the model of the dielectric waveguide radio-frequency device, a dielectric material is sectioned into four layers along a direction; the dielectric materials are ground to respective thicknesses and then polished; then each layer of quartz glass pane is cut by using an ultraviolet picosecond laser based on a two-dimensional shape of each layer to obtain four dielectric material sheets with a same size, which are a first dielectric material sheet 1-1, a second dielectric material sheet 1-2, a third dielectric material sheet 1-3 and a fourth dielectric material sheet 1-4; the four dielectric material sheets are stacked from bottom up;

the dielectric material in the step I is a quartz glass with a dielectric constant of 3.8;

the thicknesses of the first dielectric material sheet 1-1, the second dielectric material sheet 1-2, the third dielectric material sheet 1-3 and the fourth dielectric material sheet 1-4 in the step I are 3.8 mm, 0.2 mm, 1.5 mm, 1.5 mm respectively.

II. Coupling:

a number of the dielectric resonant cavities 3 is determined based on the model of the dielectric waveguide radio-frequency device, and a slot 2 with a width of 2 mm and a length 9.85 mm is opened on the four dielectric material sheets respectively; a slot 2 with a same size is opened at a same position of different dielectric material sheets, and energy coupling is performed between two adjacent dielectric resonant cavities 3 by slot 2;

the model of the dielectric waveguide radio-frequency device in the step II includes four dielectric resonant cavities 3 vertically arranged.

III. Processing tuning hole:

based on the number and a depth of the resonant cavities disposed based on the model of dielectric waveguide radio-frequency device, a tuning hole is processed respectively on the n dielectric material sheets, with each dielectric resonant cavity 3 carrying one tuning hole; the model of the dielectric waveguide radio-frequency device includes four tuning holes, where a first tuning hole 4-1 and a fourth tuning hole 1-4 have a same depth of 3.8 mm, and a second tuning hole 4-2 and a third tuning hole 4-3 have a same depth of 4 mm; the first tuning hole 4-1, the second tuning hole 4-2, the third tuning hole 4-3 and the fourth tuning hole 4-4 have a same radius of 5.2 mm.

IV. Processing energy input hole:

On the last dielectric material sheet, a first energy input hole 5-1 and a second energy input hole 5-2 are processed respectively on back surfaces of the first tuning hole 4-1 and the fourth tuning hole 4-4, where the first energy input hole 5-1 and the second energy input hole 5-2 have a same depth of 1.5 mm.

V. Adhesive coating and stacking:

an adhesive is coated on an upper surface of each dielectric material sheet other than a first dielectric material sheet and then the dielectric material sheets are sequentially stacked from bottom up to obtain four adhesive-coated dielectric material sheets;

the adhesive in the step V is a photosensitive resin adhesive, the photosensitive resin adhesive is a liquid in normal state, and an upper surface of each dielectric material sheet other than the first dielectric material sheet is put into a spin coater and uniformly coated with adhesive for 120 seconds at the rotation speed of 7000 rpm and then the dielectric material sheets are sequentially stacked with overflowing adhesive removed, and finally, exposed for 2 min under ultraviolet light so as to complete bonding process;

the photosensitive resin adhesive is SINWE-3623.

VI. bonding:

bonding is performed based on the following cases to obtain a filter.

VII. Entire metallization:

① the filter is put into an ultrasonic cleaner filled with anhydrous ethanol and cleaned for 1 min to remove surface impurities and then air-dried to obtain a dry filter;

② the dry filter is put into an ion magnetron sputtering instrument, and then with gold as target material, sputtering is performed for 200 s under the current of 9 A to obtain a gold-plated filter;

③ the gold-plated filter is connected with a cathode of an electroplating device and then soaked in an electroplating liquid; an anode of the electroplating device is connected with a pure copper plate, and then electroplating is performed for 40 min under the current of 3 A to obtain a copper-plated filter;

the electroplating liquid in the step VII. ③ is purchased from Beichen Hardware Technology Company;

④ the copper-plated filter is connected with the cathode of the electroplating device, and a cotton soaked with a gold-plating chemical solution is connected with the anode of the electroplating device, and coating operation is performed on the surface of the copper-plated filter by using the cotton under the voltage of 4V to complete the gold plating process and obtain a quartz glass waveguide radio-frequency device;

the gold-plating chemical solution in the step VII. ④ is a cyanide-free gold water provided by Weilan Science and Technology Company.

With the quartz glass material, a quartz glass waveguide radio-frequency device is manufactured respectively by the traditional machining process and the lamination manufacturing process in the embodiment 1 of the present disclosure, and then test is performed on the two devices manufactured in the two processes to obtain a return loss curve shown in FIG. 5 and a insertion loss curve shown in FIG. 6.

It can be seen from FIGS. 5 and 6 that the quartz glass waveguide radio-frequency device manufactured by the laser lamination manufacturing process of the present disclosure satisfies performance design requirements whereas, due to a manufacturing error, the quartz glass waveguide radio-frequency device manufactured by the traditional machining process differs greatly from the requirements in insertion loss, return loss and central frequency:

Central frequency: it can be seen from the above two drawings that the central frequency of the quartz glass waveguide radio-frequency device manufactured by the traditional machining process differs from the design frequency, and is 3.4 GHz which results from the machining error, whereas the laser lamination manufacturing process in the embodiment 1 can realize a higher processing accuracy and the central frequency is hence closer to the design value, namely, is, as seen from the drawing, 3.5 GHz.

Return loss: Due to the manufacturing error of the traditional machining process, the return loss is >13.6 dB, which does not satisfy the filter design requirements and hence needs to be adjusted later to meet the use requirements; in contrast, the return loss of the filter manufactured by the laser lamination manufacturing process in the embodiment 1 is >15.34 dB, which satisfies the design requirements without subsequent adjustment.

Insertion loss: for the quartz glass waveguide radio-frequency device manufactured by the traditional machining process, the insertion loss satisfies the requirements in parameters within its passband range, but due to the central frequency, its passband range is not consistent with the design passband range, which does not satisfy the filter use requirements. Thus, subsequent processing is required to adjust the filter performances. The above problem can be avoided by using the laser lamination manufacturing process of the embodiment 1. It can be seen from the drawings that in a case of the lamination manufacturing process, the central frequency satisfies the requirements and the insertion loss also satisfies the design requirements and thus no subsequent adjustment is required.

By comparison, it can be seen that the use of the laser lamination manufacturing process of the embodiment 1 can reduce the manufacturing error in a satisfactory way, such that the device can reach optimal performance, and the workload of the subsequent adjustment to the filter can be reduced, improving the production efficiency. Therefore, it is of great significance for manufacturing the filters in huge batches.

What is claimed is:

1. A manufacturing method of a dielectric waveguide radio-frequency device, comprising the following steps:

I. sectioning:

a dielectric waveguide radio-frequency device is designed, and a dielectric material is sectioned into n layers along a direction based on a model of the dielectric waveguide radio-frequency device, and then ground, polished, and cut to obtain n dielectric material sheets; the n dielectric material sheets are stacked from bottom up;

II. coupling:

based on design requirements of the dielectric waveguide radio-frequency device, a quantity of dielectric resonant cavities is determined, and coupling designing is performed between adjacent dielectric resonant cavities, and then a coupling structure is processed on the corresponding sheets of the n dielectric material sheets; and the coupling structure in the step II is of slotting coupling, through hole coupling, blind hole coupling, inclined hole coupling or windowing coupling;

III. processing tuning hole:

based on the quantity and a depth of the resonant cavities disposed based on the model of dielectric waveguide radio-frequency device, a tuning hole is processed respectively on the n dielectric material sheets;

IV. processing energy input hole:

on the last dielectric material sheet, an energy input hole is processed respectively on back surfaces of two resonant cavities of the quantity of dielectric resonant cavities;

V. adhesive coating, stacking/local metallization, adhesive coating, and stacking:

when the coupling structure in the step II is of slotting coupling, through hole coupling, blind hole coupling, or inclined hole coupling, an adhesive is coated on an upper surface of each dielectric material sheet other than a first dielectric material sheet of the n dielectric material sheets disposed on a bottom and then the dielectric material sheets are sequentially stacked from the bottom up to obtain n adhesive-coated dielectric material sheets; and when the coupling structure in the step II is of windowing coupling, local metallization is performed on a coupling structure part of the dielectric material sheets, and after the local metallization is completed, the adhesive is coated on the upper surface of each dielectric material sheet other than the first dielectric material sheet while avoiding a metallized part, and finally the dielectric material sheets are sequentially stacked from the bottom up to obtain the n adhesive-coated dielectric material sheets;

VI. bonding:

bonding is performed based on the following cases to obtain a device;

VII. entire metallization

① the device is cleaned to remove surface impurities and then air-dried to obtain a dry device;

② the dry device is put into an ion magnetron sputtering instrument, and then with gold as target material, sputtering is performed for 200 s under the current of 8 A to 10 A to obtain a gold-plated device;

③ the gold-plated device is connected with a cathode of an electroplating device and then soaked in an electroplating liquid; an anode of the electroplating device is connected with a pure copper plate, and then electroplating is performed for 40 min under the current of 2 A to 4 A to obtain a copper-plated device; and ④ the copper-plated device is connected with the cathode of the electroplating device, and a cotton soaked with a gold-plating chemical solution is connected with the anode of the electroplating device, and coating operation is performed on the surface of the copper-plated device by using the cotton under the voltage of 3V to 5V to complete the gold plating process and obtain the dielectric waveguide radio-frequency device.

2. The manufacturing method of claim 1, wherein the n dielectric material sheets in the step I have a same thickness or different thicknesses.

3. The manufacturing method of claim 1, wherein the n in the step I is $2 \leq n \leq 100$.

4. The manufacturing method of claim 1, wherein the thickness of each dielectric material sheet is in the step I 30 μm to 5 mm.

5. The manufacturing method of claim 1, wherein the dielectric material in the step I is ceramic, glass, fused quartz or resin.

6. The manufacturing method of claim 1, wherein the local metallization in the step V specifically comprises the following steps:

① a non-metallized region is covered by a mask;

the mask in the step (1) is an adhesive tape or epoxy resin;

② the n dielectric material sheets are cleaned to remove surface impurities and then air-dried to obtain n dry dielectric material sheets;

③ the n dry dielectric material sheets are put into an ion magnetron sputtering instrument, and then with gold as target material, sputtering is performed for 200 s under the current of 8 A to 10 A to obtain n gold-plated dielectric material sheets;

④ the n gold-plated dielectric material sheets are connected with a cathode of a electroplating device and then soaked in an electroplating liquid; and an anode of the electroplating device is connected with a pure copper plate, and electroplating is performed for 40 min under the current of 2 A to 4 A to obtain n copper-plated dielectric material sheets;

⑤ the n copper-plated dielectric material sheets are connected with the cathode of the electroplating device, and a cotton soaked with a gold-plating chemical solution is connected with the anode of the electroplating device, and coating operation is performed on the surface of the n copper-plated dielectric material sheets by using the cotton under the voltage of 3V to 5V to complete the gold plating process; and ⑥ the mask on the surface of the n dielectric material sheets is removed and then the n dielectric material sheets are cleaned to remove surface impurities and then air-dried to complete local metallization.

7. The manufacturing method of claim 1, wherein the depths of the resonant cavities in the step III are equal or unequal.

8. The manufacturing method of claim 1, wherein depths of the energy input holes in the step IV are equal or unequal.

9. The manufacturing method of claim 1, wherein in the case 1 in the step VI: when the adhesive used in the step V is a pre-impregnated (pp) film, the n adhesive-coated dielectric material sheets are put into a mould and cured for 30 min to 120 min at the temperature of 120° C. under the pressure of 0.5 MPa to 20 MPa, and finally an overflowing adhesive layer is ground so as to complete the bonding process;

in case 2: when the adhesive in the step V is a thermal plastic resin film, the n adhesive-coated dielectric material sheets are put into a mould and held for 2 h at the temperature of 150° C. under the pressure of 0.5 to 20 MPa while redundant thermal plastic resin film is removed, so as to complete the bonding process; the thermal plastic resin film is a polyethylene film with a thickness of 0.03 mm to 0.3 mm;

in case 3: when the adhesive in the step V is a premixed adhesive, the n adhesive-coated dielectric material sheets are put into a mould and cured for 10 min to 120 min under the pressure of 0.5 MPa to 20 MPa so as to complete the bonding process; the premixed adhesive is obtained by mixing acrylic resin, curing agent and ceramic powder at a weight ratio of 1.4:1:(0.01 to 1); the ceramic powder is titanium dioxide ceramic powder, barium titanate ceramic powder or magnesium titanate ceramic powder;

in case 4: when the adhesive in the step V is a thermosetting epoxy resin adhesive, the n adhesive-coated dielectric material sheets are put into a mould and cured for 1 h to 30 h under the pressure of 0.5 MPa to 20 MPa so as to complete the bonding process; the thermosetting epoxy resin adhesive is obtained by mixing A adhesive, B adhesive and titanium dioxide ceramic powder at a weight ratio of 3:1:(0.01 to 1);

in case 5: when the adhesive in the step V is a photosensitive resin adhesive, the photosensitive resin adhesive is a liquid in normal state, and an upper surface of each dielectric material sheet other than the first dielectric material sheet is put into a spin coater and uniformly coated with adhesive for 120 s at the rotation speed of 7000 rpm and then the dielectric material sheets are sequentially stacked with overflowing adhesive removed, and finally, exposed for 2 min to 3 min under ultraviolet light so as to complete bonding process;

in case 6: when the adhesive in the step V is an organic glue, the n dielectric material sheets are cleaned before being bonded, and then the organic glue is dripped on an upper surface of each dielectric material sheet other than the first dielectric material sheet, and then uniformly coated for 60 s at the rotation speed of 7000 rpm, and then the dielectric material sheets are sequentially stacked with overflowing glue removed, and naturally cured for 10 min to 120 min at room temperature so as to complete the bonding process; the organic glue is polysiloxane;

in case 7: when the adhesive in the step V is an inorganic glue, the n dielectric material sheets are cleaned before being bonded, and then the inorganic glue and the titanium dioxide ceramic powder with a diameter of 1 μm are mixed at a weight ratio of 1:(0.01 to 1) and then coated to an upper surface of each dielectric material sheet other than the first dielectric material sheet, and then the dielectric material sheets are sequentially stacked and held for 12 h to 24 h at normal temperature under the pressure of 0.5 MPa to 20 MPa, and then incubated for 2 h at the temperature of 80° C. to 100° C. and then incubated for 2 h at the temperature of 150° C. and finally cooled down to room temperature so as to complete the bonding process;

in case 8: when the adhesive in the step V is an inorganic silica gel, the inorganic silica gel is dripped on an upper surface of each dielectric material sheet other than the first dielectric material sheet, and then uniformly coated for 120 s at the rotation speed of 7000 rpm, then the dielectric material sheets are sequentially stacked with overflowing gel removed, and then stood for 1 h to 12 h under the pressure of 0.5 MPa to 20 MPa so as to complete the bonding process; the inorganic silica gel is a dispersion of nano-level silicon dioxide granules in water or solvent, a weight fraction of the silicon dioxide is 10% to 50%, and the solvent is water or organic solvent; the organic solvent is isopropanol, propylene glycol or anhydrous ethanol; and in case 9: when the adhesive in the step V is an anaerobic adhesive, the n dielectric material sheets are cleaned before being bonded, and then the anaerobic adhesive is dropwise and uniformly coated to an upper surface of each dielectric material sheet other than the first dielectric material sheet, and then the dielectric material sheets are sequentially stacked and held for 24 h at normal temperature under the pressure of 0.5 MPa to 20 MPa while overflowing adhesive is removed, so as to complete the bonding process.

10. The manufacturing method of claim 1, wherein in the step VII ①, the device is put into an ultrasonic cleaner filled with anhydrous ethanol and cleaned for 1 min.

* * * * *